UNITED STATES PATENT OFFICE.

HENRI RAYMOND VIDAL, OF PARIS, FRANCE.

BLACK DYE AND PROCESS OF MAKING SAME.

SPECIFICATION forming part of Letters Patent No. 622,299, dated April 4, 1899.

Application filed December 1, 1898. Serial No. 697,994. (No specimens.)

*To all whom it may concern:*

Be it known that I, HENRI RAYMOND VIDAL, a resident of Paris, in the Republic of France, have invented a new and useful Improvement in the Manufacture of Coloring-Matters, which is fully set forth in the following specification.

This invention relates to a process for obtaining a direct black coloring-matter for cotton.

I have ascertained that certain well-defined nitric substances of the aromatic series are capable of yielding in the presence of sulfur and alkaline sulfurets black coloring-matters of the highest technical value, while the materials forming the subject of Bretonniere's patent, dated September 16, 1873, No. 142,892, were only able to furnish ground colors of the kind known as "cachou de laval." I have since observed that certain nitric derivatives of the fatty series, such as nitrocellulose substances, were likewise capable of yielding black coloring-matters of the highest intensity and solidity under the same conditions of reaction. These substances are real coloring-matters and are distinguished from those of the cachou de laval kind, inasmuch as they do not require a subsequent oxidation in order to be developed upon the vegetable fiber, (on the contrary, this oxidation has the tendency of destroying the coloring-matter,) and for the further reason that they possess a considerable coloring power.

Example: Guncotton, composed to a great percentage of hexanitrated cellulose, one hundred kilograms; molten sodium sulfid, three hundred kilograms; sulfur, seventy-five kilograms; water, three hundred liters. I heat in a cast-iron vessel or digester provided with a stirring device the sulfid of sodium and water until dissolved, and then add in small portions the guncotton, which dissolves with a yellow tint while setting up a reaction in the alkalin. sulfuret. As soon as all the guncotton has been dissolved the temperature is raised and the sulfur added. The product commences to thicken and an energetic reaction sets in. When the same has terminated and the mass has been sufficiently thickened, it is poured into molds or other receivers and is then heated in a special furnace up to 280° centigrade until the state of complete desiccation has been reached. During this desiccating process it disengages ammonia and sulfureted hydrogen.

The guncotton employed according to the above example may be substituted by a raw mixture of different polynitrated cellulose substances economically obtained by the action of the nitrosulfuric mixture upon sawdust or other cellulose substances.

The products thus obtained are of a tint varying between brown black and deep black according as more or less nitrated cellulose substances are employed.

The nitrocellulose coloring-matters are supplied to the consumer in their raw condition—that is to say, mixed with alkaline sulfurets, sulfites, and hyposulfites. In this condition they dissolve into greenish-black color in the presence of water. They are precipitated by acids, the precipitate having a light-brown color. When the precipitate has not been oxidized by the air, it is fairly soluble in alkaline carbonates and in alkalies and presents a dirty-green color. In its oxidized state it is less soluble. It is soluble into dark reddish brown in concentrated sulfuric acid.

I claim—

1. The within-described process of producing coloring-matters which directly dye cotton in shades varying from brown black to deep black, said process consisting in heating a nitro-cellulose substance as specified with sulfur and sodium sulfid, substantially as described.

2. The within-described coloring-matters, derived from nitro-cellulose, of brown-black or black color, soluble in the raw state in water giving a greenish-black color, capable of directly dyeing cotton without oxidation, as set forth.

In testimony whereof I have signed this specification in the presence of two subscribing witnesses.

HENRI RAYMOND VIDAL.

Witnesses:
   EDWARD P. MACLEAN,
   JULES ALPHONSE GUSTAVE ZOUSSET.